US009424234B2

(12) United States Patent
Mihail-Cristian et al.

(10) Patent No.: US 9,424,234 B2
(45) Date of Patent: Aug. 23, 2016

(54) METHODS AND APPARATUS FOR AUTOMATICALLY CREATING VARIATIONS OF ORIGINAL CONTENT BASED ON SEARCHING FOR ALTERNATIVE CONTENT OBJECTS BASED ON CHARACTERISTICS OF THE ORIGINAL CONTENT

(75) Inventors: Ivascu I Mihail-Cristian, Bucharest (RO); Dan Banica, Baicoi (RO); Paul-Alexandru Chirita, Bucharest (RO); Alexandru C. Costin, Domnesti (RO)

(73) Assignee: Adobe Systems Incorporated, San Jose, CA (US)

(*) Notice: Subject to any disclaimer, the term of this patent is extended or adjusted under 35 U.S.C. 154(b) by 340 days.

(21) Appl. No.: 13/171,873

(22) Filed: Jun. 29, 2011

(65) Prior Publication Data
US 2013/0007605 A1 Jan. 3, 2013

(51) Int. Cl.
*G06F 17/00* (2006.01)
*G06F 17/21* (2006.01)
(52) U.S. Cl.
CPC ................................ *G06F 17/211* (2013.01)
(58) Field of Classification Search
CPC .................... G06F 17/211; G06F 17/212
USPC .......................................................... 715/255
See application file for complete search history.

(56) References Cited

U.S. PATENT DOCUMENTS

| | | | | |
|---|---|---|---|---|
| 6,938,203 B1* | 8/2005 | Dimarco et al. | ............... | 715/209 |
| 8,607,166 B2* | 12/2013 | Jalon | ..................... | G06F 3/0481 715/835 |
| 2002/0029232 A1* | 3/2002 | Bobrow | ............ | G06F 17/30011 514/534 |
| 2006/0010211 A1 | 1/2006 | Patrick et al. | | |
| 2006/0080329 A1* | 4/2006 | Skibo | ..................... | G06F 17/248 |
| 2007/0055680 A1* | 3/2007 | Statchuk | ........... | G06F 17/30734 |
| 2007/0176945 A1* | 8/2007 | Moran et al. | .................. | 345/594 |
| 2008/0086688 A1* | 4/2008 | Chandratillake | . | G06F 17/30817 715/719 |
| 2008/0112684 A1* | 5/2008 | Matsushita et al. | ............. | 386/52 |
| 2010/0037177 A1* | 2/2010 | Golsorkhi | .......... | G06Q 30/0603 715/818 |
| 2011/0075992 A1* | 3/2011 | Mei et al. | ...................... | 386/249 |
| 2011/0167081 A1* | 7/2011 | Kosaka et al. | ................. | 707/769 |
| 2011/0252299 A1* | 10/2011 | Lloyd et al. | .................... | 715/212 |
| 2013/0007587 A1* | 1/2013 | Marantz | ............ | G06F 17/30867 715/234 |

OTHER PUBLICATIONS

Aaron Shapiro "Ad Exchanges: Disrupting the Digital Agency" published on clickz.com Jul. 20, 2010, downloaded from http://www.clickz.com/clickz/column/1724710/ad-exchanges-disrupting-digital-agency on Nov. 30, 2012, pp. 1-8.

(Continued)

*Primary Examiner* — Laurie Ries
(74) *Attorney, Agent, or Firm* — Wolfe-SBMC

(57) ABSTRACT

Methods and apparatus for various embodiments of an Automated Creative Content Generation (ACCG) system provide different methods for automating the creative generation of customized variations of original content productions. The original content productions may include images and/or text. Various methods are presented by which the ACCG system begins with an original content production, searches for alternative content, potentially modifies the alternative content, and automatically creates one or more content variations that include the alternative content.

20 Claims, 15 Drawing Sheets

(56) References Cited

OTHER PUBLICATIONS

Stephanie Clifford, "Web Marketing That Hopes to Learn What Attracts a Click" published by The New Yourk Times on Dec. 3, 2008, downloaded from http://www.nytimes.com/2008/12/03/business/media/03adco.html?_r=1&sq=tumri&st=cs on Nov. 30, 2012, pp. 1-3.

"Finally, Online Video Ads Customized On-The-Fly to Viewer Demographics and Behavior", published by Teracent Aug. 10, 2009, pp. 1-2.

* cited by examiner

METHODS AND APPARATUS FOR AUTOMATICALLY CREATING VARIATIONS OF ORIGINAL CONTENT BASED ON SEARCHING FOR ALTERNATIVE CONTENT OBJECTS BASED ON CHARACTERISTICS OF THE ORIGINAL CONTENT

BACKGROUND

Creative professionals often use software tools to create graphical content. For example, a designer may create an advertisement document having multiple content objects, such as a background image, a product logo, and text copy. The choice of which content items to include in a creative document affects how effective the document may be for its intended purpose, such as advertising. Moreover, the placement and sizing of the different content objects relative to one another in the document, as well as use of color and formatting/style choices for each content object may also affect the effectiveness of the document.

Even for a document with only a few different content objects, there may be a nearly infinite number of possible variations of how to create the document. For example, a document designer may choose from among thousands of different suitable background images for a given advertising document. Numerous different variations of a product logo may be available. Text copy for the document may be written in numerous different ways, with different font choices, text colors, styles, formats, etc. To create an effective document, a document designer may desire to create and explore many different variations of the document for comparison. Creating such variations may be a burdensome process.

SUMMARY

In one embodiment, a system may select a content object from multiple content objects making up the elements of an original content production. Given a selected content object, the system may search for alternative content objects according to search parameters based on metadata for the original content production. The system may then automatically create a new content object based on the alternative content object and one or more characteristics of the original content production. The system may then automatically create a portion of a content variation by incorporating the new content object within the content variation. The selecting, searching, and creating steps may then be repeated until the content variation is complete. If more than one content variation is specified, the above steps used to create a single content variation are repeated until a pre-defined number of content variations has been created.

Figure 1:
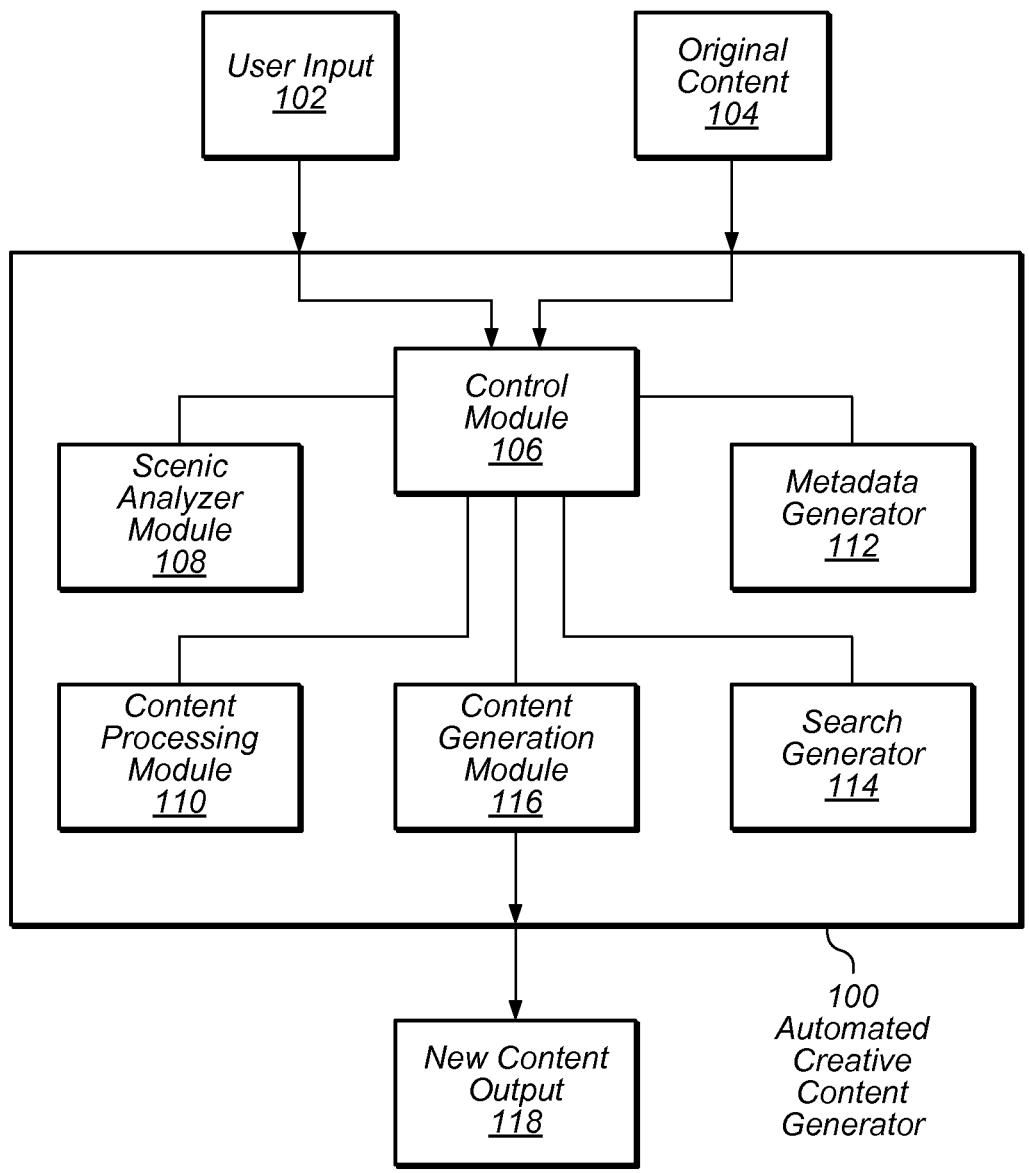
FIG. 1 illustrates a module that may implement an Automated Creative Content Generation (ACCG) system, according to some embodiments.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

Various embodiments of an Automated Creative Content Generation (ACCG) system provide different methods for automating the creative generation of customized variations of original content. The original content may include images and/or text. Various methods, described below, are presented by which the ACCG system begins with original content, searches for alternative content, potentially modifies the alternative content, and automatically creates one or more content variations that include the alternative content.

The ACCG system may be included as a plugin within a third party software tool that allows a creative professional to design new content productions. Creative professionals may sometimes be tasked with creating multiple content productions for different media outlets. In many cases, the multiple content productions generated by the creative professional may be composed of similar content objects and those content objects may vary on size, color, and location within the content production.

In some embodiments, the ACCG system may allow a creative professional to generate a set of content variations based on characteristics of a target demographic or to an individual potential customer. As discussed below, the ACCG system may direct a search for alternative content objects based on metadata, and if the metadata is based on information for a target demographic or target customer, the resulting content variation may be more appealing or relevant to the target customer or customers.

In other embodiments, the ACCG system may allow a creative professional to specify guidelines by which a new content production may be generated, without target audience information. However, the guidelines provided to the ACCG system may not always fully specify the characteristics of any resulting content production, which allows the ACCG system the flexibility to find novel alternative content objects with which to create new content variations. Alternatively, the ACCG system may receive fully specified guidelines, however the new content production generated may still produce novel results because the content repositories may include content that is novel to the creative professional, and the alternative content objects may be modified and combined in ways that are novel to the creative professional and different from the original content.

In the following detailed description, numerous details are set forth to provide a thorough understanding of claimed subject matter. However, it will be understood by those skilled in the art that the claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Embodiment: Automated Creative Content Generator

FIG. 1 illustrates an embodiment of an Automated Creative Content Generator. Given input that may include user preferences for specifying a number of variations, characteristics of those variations, and original content, the Automated Creative Content Generator may generate the specified number of content variations according to the below described process.

The Automated Creative Content Generator includes a control module 106 for receiving user input 102 and original content 104. Original content 104 may be content objects from an original content production, as reflected in step 202 of FIG. 2. Original content 104 may originate from local storage or from a remote content repository. User input 102 may be search parameters or metadata according to step 204 of FIG. 2.

In one embodiment, control module 106 may analyze user input, including original content objects from which the Automated Creative Content Generator may generate metadata. To generate the metadata, the control module 106 may communicate with scenic analyzer module 108 and metadata generator 112. The metadata may then be the basis for a search for alternative content objects, as reflected in step 204 of FIG. 2.

Search generator 114 may produce the search resulting in content objects that in turn may be modified by content processing module 110. Content processing module 110 may apply various transformation functions to calculate a new color, position, and size of a new content object based on the alternative content object, as reflected in step 208 of FIG. 2.

Content generation module 116 may base newly created content productions on the modified content objects and produce new content output 118, such as a new content variation. The creation of a new content production is reflected in step 210 of FIG. 2. Further, if multiple new content productions have been specified to be created, the content generation module 116 may repeat the above steps until the specified number of new content variations has been generated.

Each of the modules within the ACCG system may be implemented by program instructions stored in a computer-readable storage medium and executable by one or more processors. Other embodiments of the modules within the ACCG system may be at least partially implemented by hardware circuitry or firmware within one or more processors.

Example Embodiment: Generating a New Content Production

Figure 2:
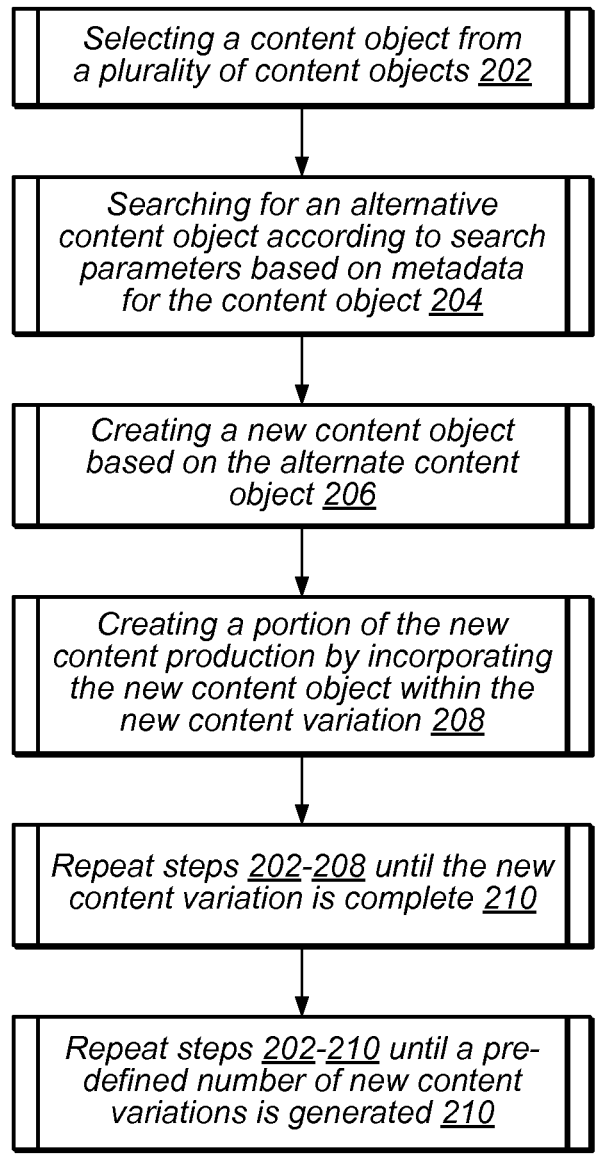
FIG. 2 is a flowchart of an embodiment of the ACCG system.

FIG. 2 illustrates a flowchart highlighting certain processing steps that may be present in an embodiment of the ACCG system. As outlined before, the ACCG system may generate one or more new content productions, which are variations of an original content production. A content production may be an advertisement, a marketing presentation, or any type of media production. Content objects within a content production may be still images, text captions, or Flash® or video segments.

In some embodiments, the new content productions produced by the ACCG system may be variations of existing content objects of an original content production. A user may choose to have the ACCG system create new content productions where only a subset of the entire set of content objects within an original content production are varied. For example, in a content production for a car advertisement, the content production may include content objects for a car, a flock of birds overhead, a tree, multiple text captions, a background, and a logo. In this example, the user may only wish to create new content objects where variations are made from one of the multiple text captions, the car, and the tree, while not varying the background, the flock of birds, the logo, and the remaining text captions.

In some embodiments, the new content production may be a content production represented by layers of content objects, and in this case, content objects generated by the ACCG system may be incorporated into the new content production by introducing a layer for each new content object. In other embodiments, the new content production may be a flat image, without layers, in which case, the ACCG system may introduce content objects by replacing pixel values of the existing content production with the pixel values of the content object rendered as an image.

In this example, a new content production may be created to include the content objects that are not intended to be varied. Into this new content production, the content generated by the ACCG system may be introduced. After the ACCG system has introduced each new content object variation, the new content production may be considered complete.

Given the new content production created, yet lacking some content elements, the ACCG system selects a content object from a plurality of content objects, as reflected by step 200. In this example, there may be an original car content object, an original logo content object, and an original text caption content object. For each content object selected by the ACCG system, an alternative content object may be searched for, and in some cases, modified. The resulting alternative content object may then be introduced within the new content production. This process will occur for each of the three content objects. In this way, the new content production, when completed, may include three alternative content objects as replacements of the three original content objects along with the existing content objects of the original content production which were not replaced.

Once an original content object has been selected from the plurality of content objects, the ACCG system may search for an alternative content object, as reflected by step 204. The search for an alternative content object may proceed in several ways. One way for the search to proceed is for a user to have tagged the original content object with metadata describing features or characteristics of the original content object. For example, if the original content object is a blue, four-door station wagon, each of these descriptive elements may be reflected within metadata defined for the original content object. This metadata may then serve as the basis for searching for content objects which may then be used to create alternative content objects. In some embodiments, a user may specify that search results should be filtered based on aspect ratio.

A further guide for the ACCG system in searching for alternative content objects are optional search parameters entered by the user. The search parameters may specify restrictions or lack of restrictions when searching for an alternative content object. For example, a user may specify that only blue cars may be selected, or that any color car may be selected.

In other embodiments, the ACCG system may use both metadata and search parameters in searching for alternative content objects. In the case that multiple new content productions are to be generated, the ACCG system may randomly weigh the metadata and search parameters for each of the individual new content productions generated.

Once an alternative content object has been found by the ACCG system, the alternative content object may then be manipulated to create a new content object, as reflected by steps 206 and 208. One manner in which the alternative content object may be modified is to calculate the color distance between the alternative content object and the background content object of the new content production being generated. Based on the color distance calculation, the colors making up the alternative content object may be changed to better match or complement the colors of the background. For example, if the background scene depicts a bright, sunny day, the colors of the alternative content object may be lightened to better match the background colors. Further examples of modifying the colors of the alternative content object are discussed below with respect to FIG. 13.

Another way in which the alternative content object may be modified to fit within the new content production is by adjusting the size of the alternative content object. For example, given an alternative content object depicting a car, the dimensions of the alternative content object may be such that if placed within the new content production unchanged, the scale of the alternative content object may not be consistent with the scale of other content objects already present within the new content production. In some embodiments, the dimensions of the original content object, which in this case depict an original car, may be used to determine an appropriate size for the alternative content object.

In other embodiments, a determination of an appropriate size for the alternative content object may depend on the size and locations of salient areas within the existing content production. For example, if it is not possible to place the alternative content object without covering up a salient area, then the alternative content object may not be used, and instead, another alternative object may be found.

In other embodiments, search parameters may specify a size dimension, or a range of dimension values that should be met by any content objects considered. In such an embodiment, no resizing may be necessary because content objects with dimensions outside the search range are not returned by the search for an alternative content object.

At this point in the process, an alternative content object has been found and modified to be included within the new content production. The alternative content object may make up only a single element of the new content production. In this example, the alternative content object, after being modified to a new content object, may be included within the new content production by adding a new layer to new content production.

Once this process completes for the first content object selected, the process may be repeated for each of the remaining content objects within the plurality of content objects, as reflected within step 210. In this example, the process may be repeated twice more, once for the finding and creating an alternative content object for the original logo content object, and once for finding and creating an alternative content object for the original text caption content object.

When alternative content objects have been found for all content objects in the original, modified, and included within the new content production, the first instance of newly created content variation will have been created.

In some embodiments, the ACCG system may accept parameters indicating that some number of new content productions are to be created. In this case, after each new content production is completely created, the ACCG system may begin again by finding and creating a second set of alternative content objects. Even if only one content object of the second set of alternative content objects is different, a different content production is the result. The only restriction on the quantity of advertisement images to be created is the number of content objects available to be searched. Given content on the Internet, or a large repository of content objects, and the multiple combinations possible, the upper bound is effectively unlimited. The creation of multiple new content productions after a first new content production is reflected in step 210.

Example Embodiment: Deconstructing an Original Content Production

Figure 3:
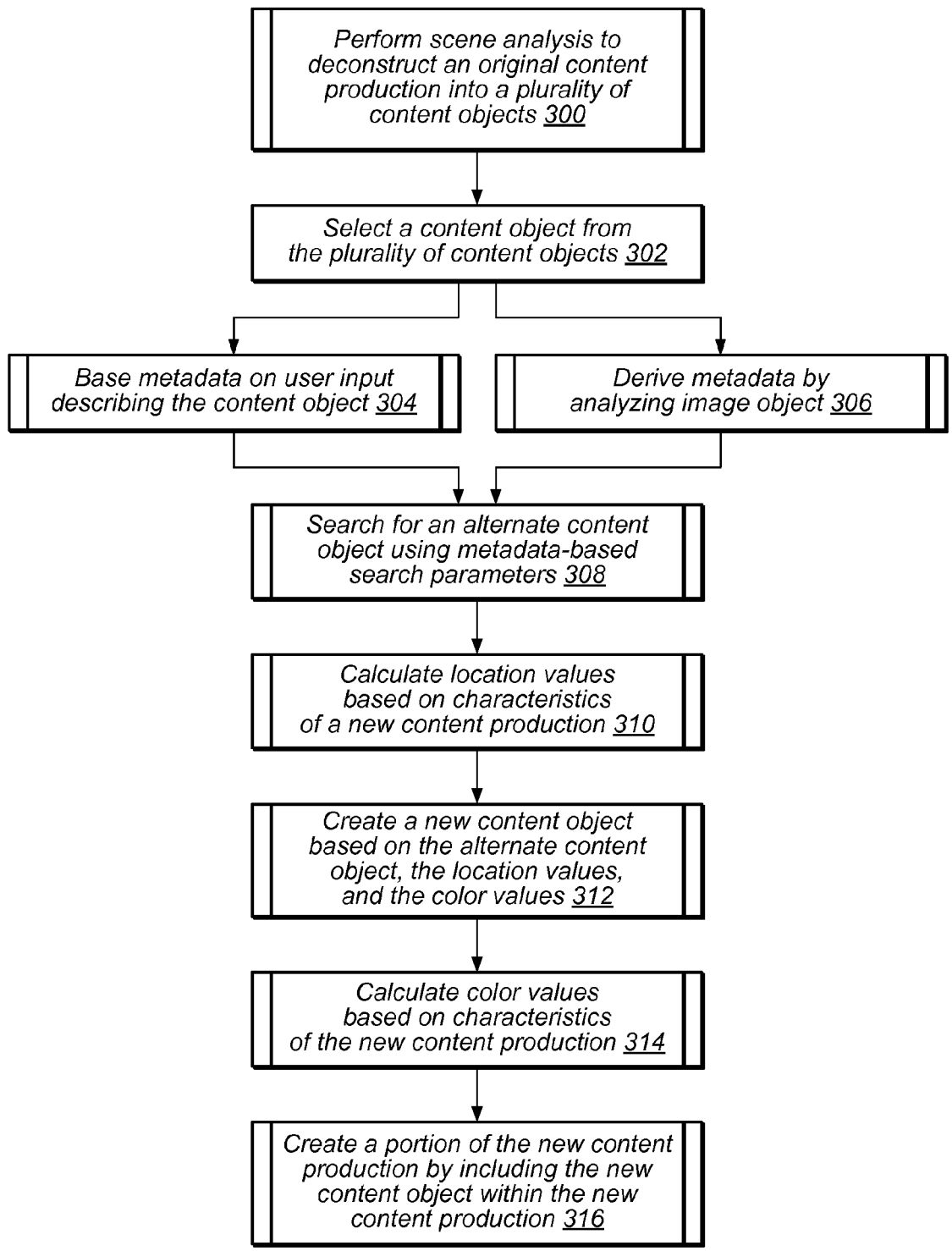
FIG. 3 is a flowchart of an embodiment of the ACCG system.

FIG. 3 illustrates a flowchart highlighting certain processing steps that may be present in an embodiment of the ACCG system. The overall process of this embodiment of the ACCG system is similar to that presented above with respect to FIG. 2, where given an original content production, a new content production may be generated that is a variation of the original content production. In the example discussed above with respect to FIG. 2, the original content production included content objects represented as layers. In this example, an original content production may be a graphical image in any format, for example, a GIF or JPG format.

In this embodiment, the ACCG system begins with an original content production. Step 300 represents the performance of a scene analysis to deconstruct the original content production into a plurality of content objects. This scene analysis process recognizes content objects that make up the original content production. For example, in a presentation for an overview of tablet computers, with an opening image of a tablet computer, a manufacturer's logo, and multiple text captions, the scene analysis may recognize each of these component content objects. In this example, a content object may simply be an area of pixels within the original content production. In the process of recognizing images and other content, information used in recognizing the content may be used to generate metadata describing characteristic elements of the content objects found. For example, if one of the recognized content objects is a text caption, the ACCG system would recognize the object as representative of text, and perform an optical recognition process to determine the text for use in generating metadata.

From the set of content objects produced by the scene analysis, the ACCG system may select a first original content object, as reflected by step 302. Once an original content object is selected, the next step is to access metadata associated with the content object in order to conduct a search for alternative content objects. This metadata may come from either an analysis of the content object, or from user input, or from both. Step 304 corresponds to using metadata based on user input, and step 306 corresponds to using metadata derived through an analysis of the original content object.

From step 302, the ACCG system may access metadata based on user input, where the metadata is created to describe the original content, as reflected by step 304. A user may provide information on which to base metadata similar to the process described with respect to FIG. 5. For example, if the content object is a text caption of the word "revolutionary", a user may input metadata information that may be used in directing a search for alternative, yet similar text captions. For the word "revolutionary", a user may, for example, enter information such as names of revolutionary figures in history, or years that are symbolic of revolutions, such as 1776, or revolutionary battles, or revolutionary products such as a transistor, or a wheel. The user may also specify negative restrictions such as specifying that no images of guns be used. Another example would be, in the case that the original content object is a car, that only sedans be found, or anything but sport utility vehicles.

In other embodiments, metadata for directing a search entered by a user may not simply apply to a single content object. Instead, a user may enter higher level metadata such as a description of an overall tone for the new content production created in order to target a particular demographic or individual. For example, a user may specify "edgy", "tranquil", or "conservative", and each of these terms may be applied to guide each search, when possible, for alternative content objects.

From step 304 of FIG. 3, the ACCG system may proceed to augment the metadata entered by the user with metadata derived from an analysis of the content object. At this point, the ACCG system may proceed to step 308, and search for new content objects.

From step 302 of FIG. 3, the ACCG system may also proceed to step 306. At this point, for example, if the selected content object is a text caption of the word "revolutionary", optical character recognition would recognize the word, and the ACCG system may then derive metadata such as synonyms, or phrases related to the word "revolutionary."

From step 306 of FIG. 3, the ACCG system may proceed to augment the metadata with metadata based on user input. Alternatively, the ACCG system may proceed to step 308, and search for new content objects.

Once the ACCG system has acquired metadata associated with the original content object, a next step may be a search for an alternate content object using the metadata, as reflected in step 308. The search may be directed at a local content repository, or the search may access remote sites, or both. For example, the ACCG system may conduct an Internet search for content using keywords derived from the metadata associated with the original content production. Alternatively, or in addition to searching the Internet, the ACCG system may search a content repository, such as gettyimages.com or flickr.com.

Once the ACCG system has found an alternative content object, the next three steps in the process, depicted by steps 310, 312, and 314 are directed toward manipulating the alternative content object to create a version of the alternative content object that may be used to generate a portion of the new content production.

At step 310, the ACCG system may determine where within the new content production to place the new content object. This determination may be based on calculating a saliency function, or user preferences, or both. A saliency function may determine which areas of a background image of the new content production into which the alternative content may be placed and would result in a good contrast of colors and less cognitive burden for the recipients who will look at the new content production. A user may have also specified that in the cases of logo objects, placement should tend toward the corners, or any other area of the new content production.

At step 312, the ACCG system may perform additional adjustments to the alternative content object such as resizing, rescaling the width, rescaling the height, or in the case the alternative content object is a flat image, cropping portions of the alternative content object. These adjustments may be used in determining colors of the alternative content object because in some embodiments, the ultimate size and location of the alternative content object factor in to how the colors of the alternative content object are determined.

At step 314, the ACCG system may calculate color distances between the color or colors in the alternative content and the color or colors of the background or other content objects within the new content production. Depending on the color distances, the ACCG system may adjust the color palette of the alternative content object or the color palette of the new content production to achieve an attractive complement of colors as determined by color distances. For example, if the color distance is beyond a pre-defined threshold, the colors of an alternative content object may be scaled up or down in order to bring the color distance between the alternative content object and the new content production to within the pre-defined threshold. Additional methods for adjusting the colors of the alternative content object are presented below with respect to the discussion of FIG. 13.

At step 316, the ACCG system may include the modified alternative content object created into the new content production. If the new content production is managed by an image editing tool that implements layering, the ACCG system may introduce a layer representative of the alternative content object created. Otherwise, the ACCG system may draw the alternative content object into the new content production by replacing the pixel values of the background image with the pixel values of the created alternative content object.

After a first run through the steps of the flowchart in FIG. 3, the ACCG system will have introduced a single alternative content object into the new content production being created. Once each of the original content objects has been similarly processed, a complete and original content variation will have been created. This process may then be repeated as many times as a user wishes to generate new content productions.

Example Embodiment: New Content Productions Based on a Template of Objects

Figure 4:
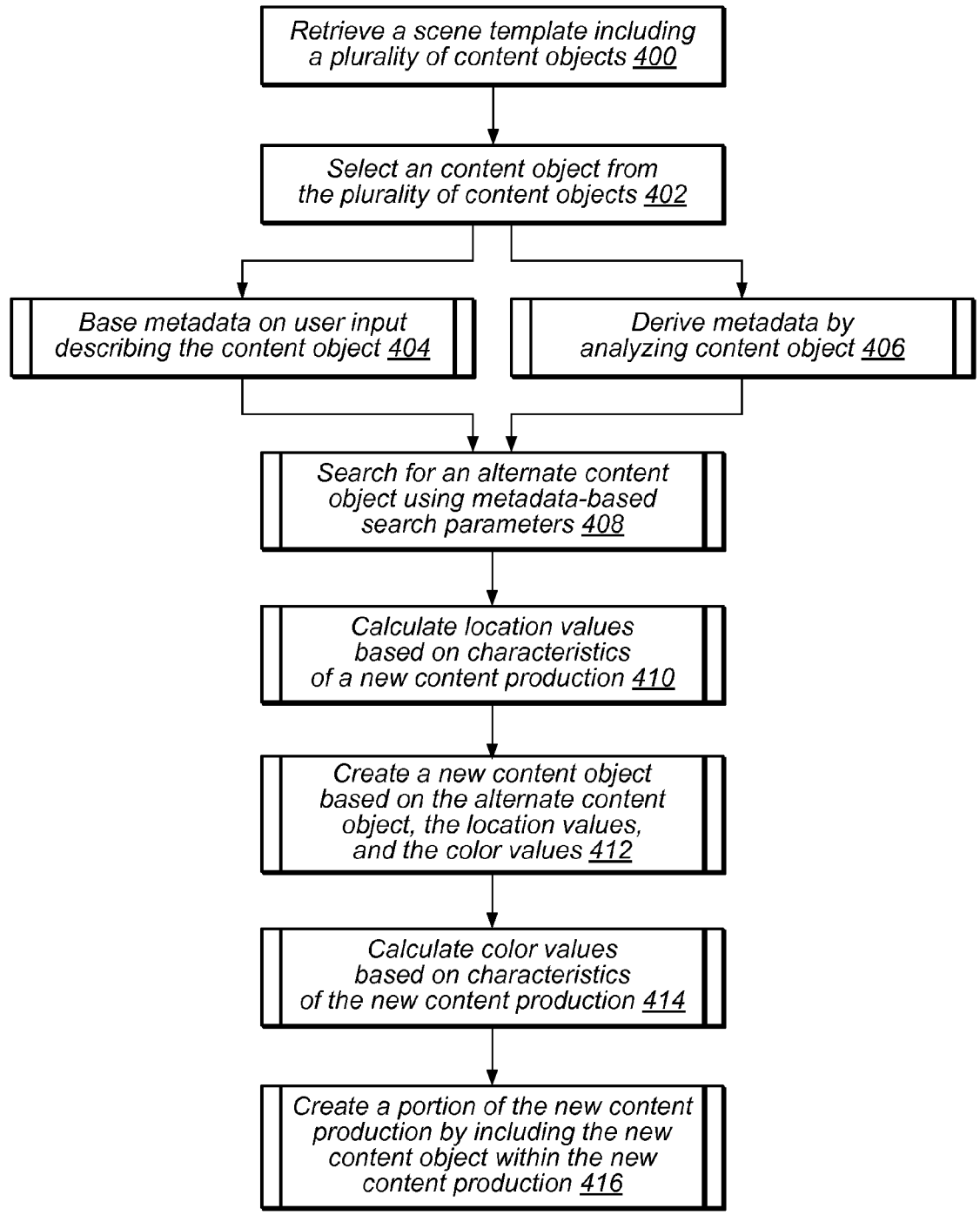
FIG. 4 is a flowchart of an embodiment of the ACCG system.

FIG. 4 illustrates a flowchart similar to the flowchart presented in FIG. 3. However, where the flowchart in FIG. 3 begins with a scene analysis step, step 300, the flowchart in FIG. 4 begins with a retrieval of a template, step 400. The template in this example includes a plurality of content objects. This template may be configured by a user that may know certain elements that should be present within content to be generated, but that has not yet created an original content production.

In this example, instead of having an original content production, a user may define a template to include a car content object, a logo content object, a text caption content object, and a background content object. Each of these template elements may serve as the basis from which new content objects may be generated. Given that a user is selecting the content objects to include in the template, there is no need to perform a scene analysis to identify content objects.

Once the user has created the template of content objects, the ACCG system proceeds similarly to the example in FIG. 3, proceeding to the selection of a content object from the plurality of content objects in the template. As with FIG. 3, after a first run through the steps of the flowchart, the ACCG system will have introduced a single alternative content object into the new content production being created. Once each of the original content objects has been similarly processed, a complete and original content production will have been created. This process may then be repeated as many times as a user wishes to generate new content.

Example Embodiment: New Content Production Based on Metadata

Figure 5:
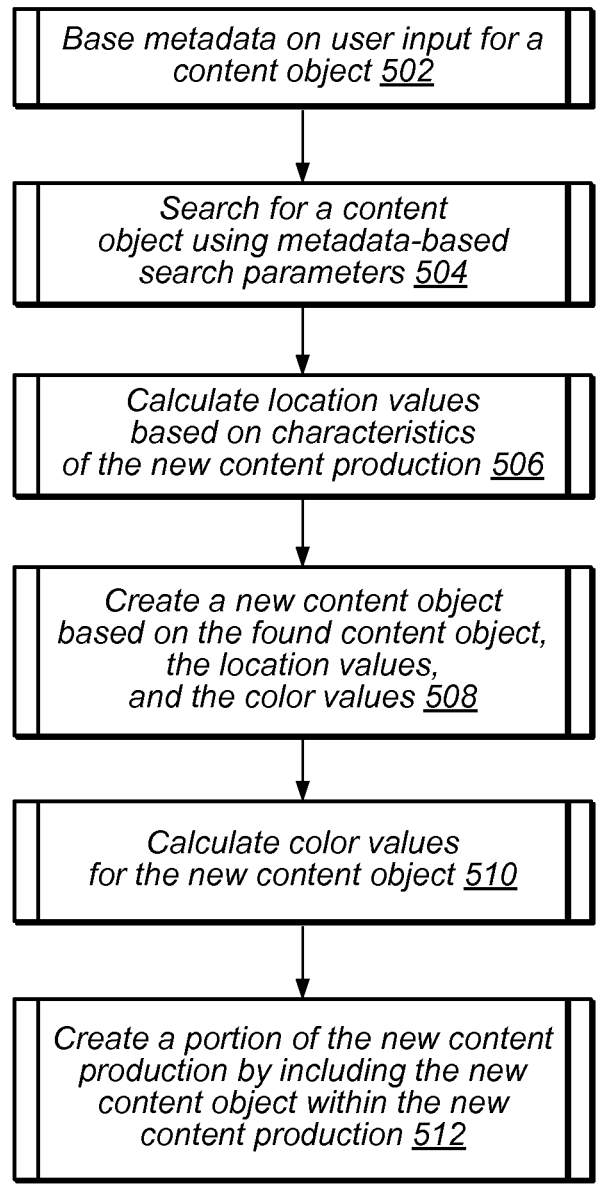
FIG. 5 is a flowchart of an embodiment of the ACCG system.

FIG. 5 illustrates a flowchart for an embodiment of the ACCG system that, unlike the embodiments above described with respect to FIGS. 3 and 4, does not begin with a set of content objects or with an original content production. Instead, FIG. 5 depicts steps of a process where a user enters information that may then direct the search for initial content objects.

In this embodiment, the user may enter search terms through, for example, a user interface. The search terms or information collected may then be used to construct metadata, as reflected in step 502. The user interface may provide various fields of data entry where a user may enter search criteria for content such as specifying "car", that the car is a sedan, that the car is red, green, or blue, and that the car is manufactured by a particular car manufacturer. The user may also enter input specifying that a background image for the content to be generated be similar to a mountain road, or alternatively, an empty desert.

The user may repeat the process of creating metadata for each element, or content object to be included in a new content production. In this way, instead of the ACCG system beginning with a set of content objects and an original content production, the ACCG system uses a set of metadata to generate one or more content objects. The one or more content objects generated from the metadata may then be combined to create a new content production.

Once the user has entered information used to create a set of metadata, a search may be conducted to find content objects, as reflected within step 504. From this point, the ACCG system will proceed similarly to the examples discussed in FIGS. 3 and 4 above, beginning at steps 308 and 408, respectively. The process in FIG. 5, once the metadata has been created, similarly proceeds to a step in the flowchart, step 504, that corresponds to steps 308 and 408.

Proceeding from steps 504 through 512, the ACCG system may find a content object based on the metadata, and determine content object characteristics such as location, color, size, and in the case of text captions, text styles for a new content object. The new content object may then be included within the new content production. At the end of one iteration of this process, a single content object has been created and included within the new content production. Repeating this process for each of the metadata elements may result in a complete content production created from the metadata.

Example Embodiment: Delayed Generation of a New Content Production

Figure 6:
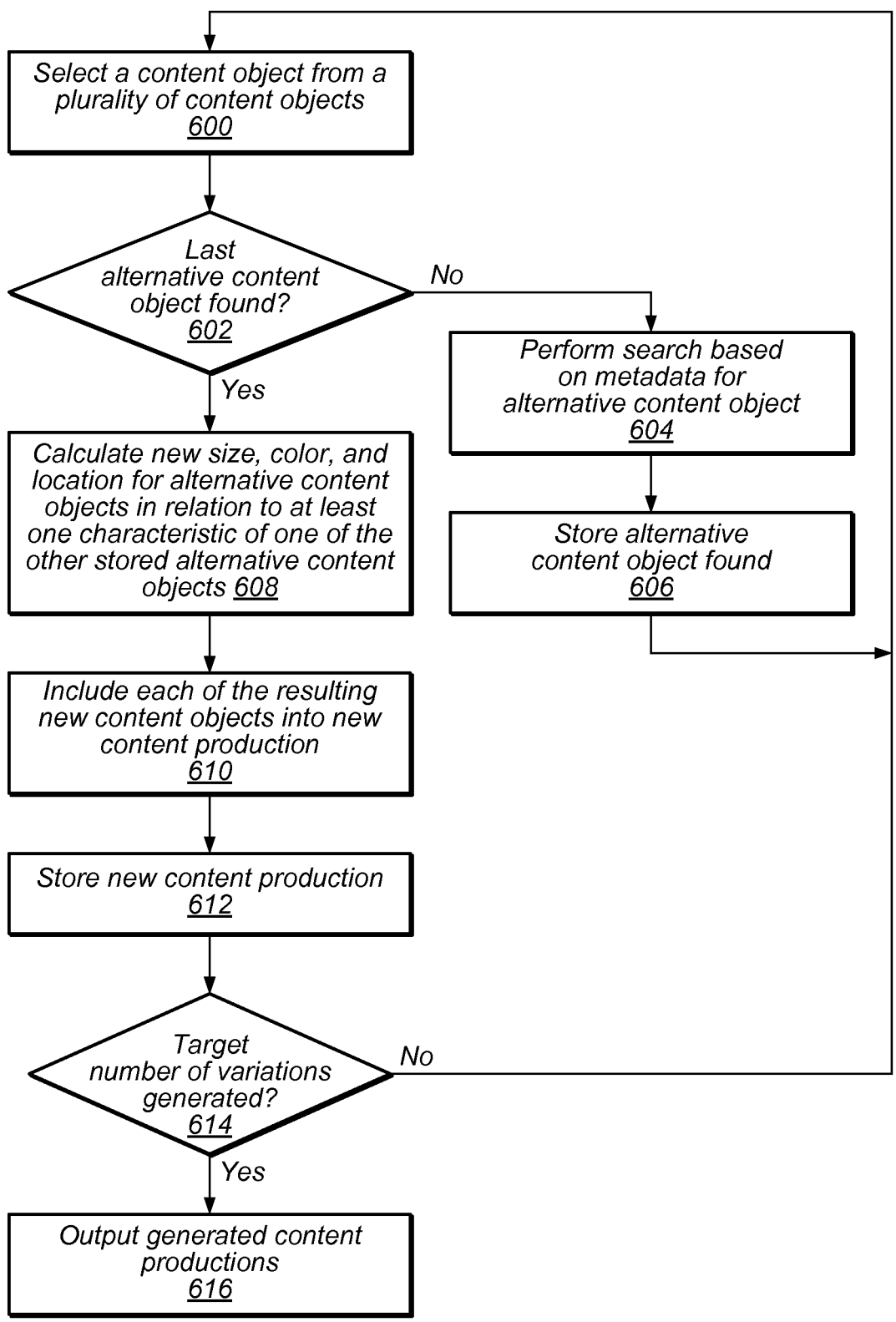
FIG. 6 is a flowchart of an embodiment of the ACCG system.

FIG. 6 illustrates a flowchart presenting some of the steps in an embodiment of the ACCG system. Similar to the example described above with respect to FIG. 3, this embodiment begins with a selection of a content object from a plurality of content objects. Each of these content objects, after processing, may serve as the elements that may make up a new content production. However, one place where this embodiment differs from the embodiment presented above with respect to FIG. 3, is that in this embodiment, each of the alternative content objects is found before they are included within a new content production. Delaying the incorporation of the created alternative content objects allows for additional types of processing of the alternative content objects before they are incorporated into the new content production.

This embodiment, as with the earlier embodiments, is also suitable to a parallel processing solution. For example, if x alternative content objects are to be found and processed according to the ACCG method, then y processors may be used to search for and process each alternative content object. In the case that x=y, then each processor may be assigned responsibility for a single content object; otherwise, different allocations of tasks to processors may be used.

After the selection of a content object from a plurality of content objects, as in step 600, the ACCG system determines whether each of the plurality of content objects has been processed, as in step 602. For example, in the case of the first content object selected, there may not yet be any alternative content object found because a search of an alternative content object has not yet occurred. In this initial instance, the next step may be step 604, which performs a search based on metadata that guides the search for a first alternative content object. Once the alternative content object is found, it may then be stored as in step 606, and processing may continue at step 600, where the next content object may be selected.

If there is only a single content object, the determination step at step 602 may now result in a positive answer to the question of whether the last alternative content object has been found. In this terminal condition for the iterations, processing may continue at step 608. Otherwise, if more content objects are to be processed, processing may continue at step 604 until all content objects from the plurality of content objects have been processed.

At the point that the process reaches step 608, an alternative content object has been found and stored corresponding to each of the original content objects of the plurality of content objects. Given that all alternative content objects are available simultaneously, content processing may be performed that considers content characteristics of the alternative content objects with respect to one another before inclusion within the new content production. For example, given two alternative content objects, one depicting a text caption and one depicting a logo, the alternative content object depicting the text caption can be sized to be similar in size to the logo, in one variation of newly created content. This content processing is in addition to the previously described content processing steps related to color and location calculations.

In other embodiments, the process described above with respect to FIG. 3 could be modified to post-process earlier placed content objects within the new content production. In this way, similar results to the process described with respect to FIG. 6 may be achieved.

Once the processing steps of step 608 have been applied to at least one of the alternative content objects found, the alternative content objects are in condition to be included within the new content production, as reflected in step 610. The generated content object is stored in step 612, and a determination may be made as to whether the target number of content productions has been generated, as reflected in step 614.

If the determination is made that the target number of content productions has yet to be generated, processing may continue to step 600, which begins the process again in order to create another content production. Otherwise, the result may be to output the stored generated content productions. The output may be any type of signal indicating that the generated content objects are ready or an actual transmission of the content variations.

Example Embodiment: User Interface for Specifying Variations

Figure 7:
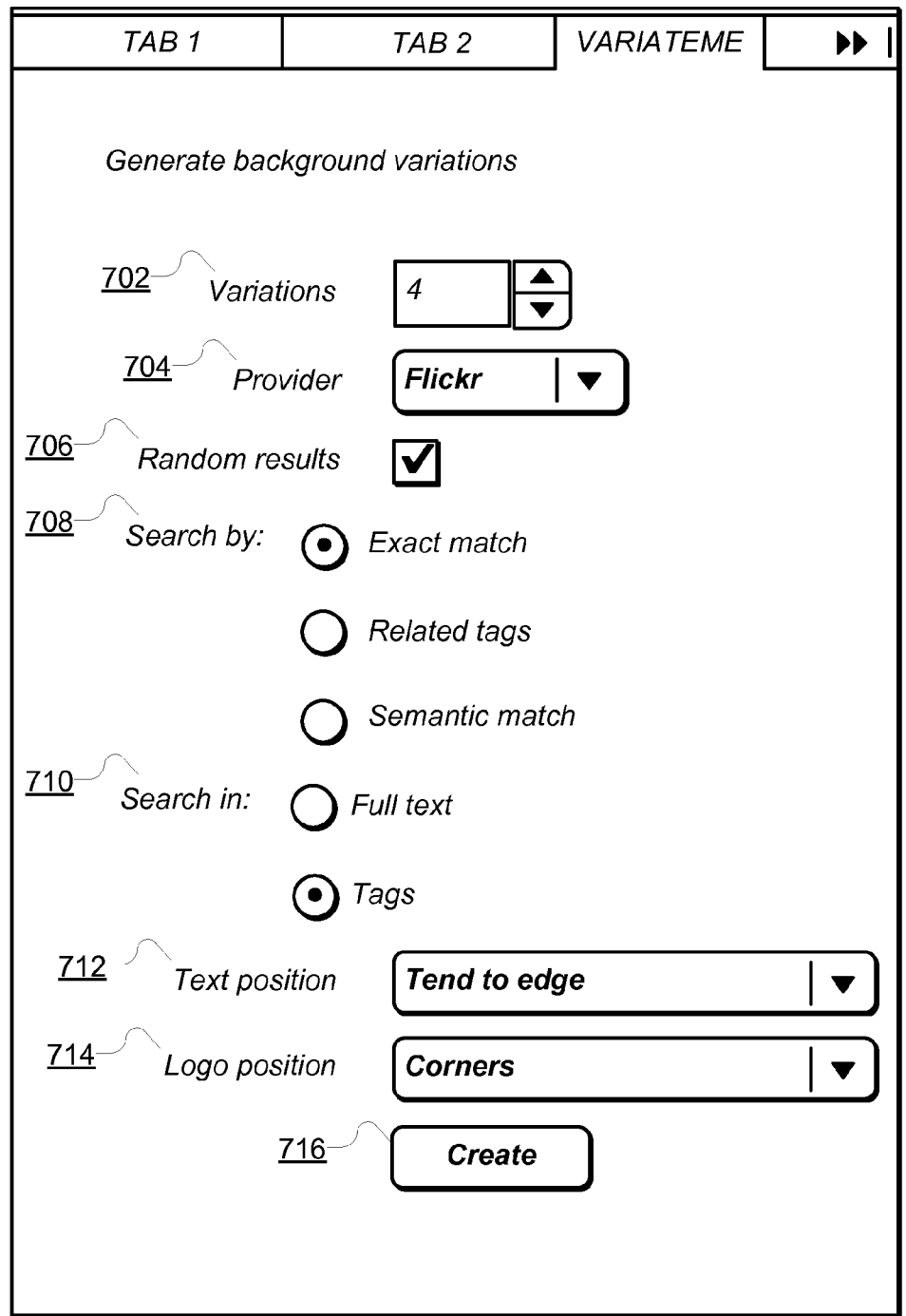
FIG. 7 illustrates a window providing menu options to a user to direct a search for alternative content and guidelines for creating new content, according to one embodiment.

FIG. 7 depicts an example menu window within a user interface available to a user that allows a user to specify search options for a content object. The entry of user-specified information for guiding a search is one part of the overall ACCG system, and corresponds to step 304 of FIGS. 3 and 404 of FIG. 4, in which information is collected before a search for alternative content objects is performed. The menu window in FIG. 7 corresponds to an embodiment of the ACCG system that incorporates ACCG functionality within an image editing tool. In this case, a user may be creating an original content production, and upon creation or during creation, the user may invoke menu window 700 to invoke the ACCG system functionality. The information entered by the user through menu window 700 may be used to generate metadata for searching for alternative content objects.

In this example, a user has selected four variations on the original content production to be created by the ACCG system, as reflected by element 702. The user has also indicated that Flickr should be the repository in which to search for alternative content, as reflected in element 704. Flickr is but one of several content repositories available over the Internet. The user has also specified that a search for alternative content objects be an exact match to the keywords entered by the user, as reflected in element 708. Other options available to the user are "Related Tags" which may expand the search beyond a strict keyword match to include similar keywords. The "Semantic Match" option may expand the search further still, to include keywords that are semantically similar in meaning A user may further direct the search by specifying whether content in a content repository is to be searched according to all text associated with a content object, the "Full text" option, or whether only the tags associated with a content object are to be searched, the "Tags" option, as reflected in element 710.

The "Text position" menu option provides a list of types of preferences to apply within the content positioning algorithm when positioning text objects, as reflected in element 712. In addition to the "Tend to edge" option selected, other options may include tending toward the margins, tending toward the corners, tending toward the lower corners, only the lowest information area of the background image, the lowest information area of the background image that is also surrounded by high information zones, and a low information zone that is above a high information zone.

Information zones are determined after computing an information matrix for the background image, and an information matrix is based on a saliency map of the background image. The information matrix may also use other factors as a basis, such as output from a facial detection analysis. Saliency provides a measure of the information conveyed by pixels, for example, in an area with a highly repeating pattern of pixel colors, the saliency will be low. The facial detection analysis provides a factor to weigh the information matrix away from positioning objects on top of faces. Other similar element detection analyses can be included as well in order to weigh the information matrix in one direction or the other, as the user prefers.

The facial detection analysis is one of several types of element detection analysis available. For example, in some embodiments, a user may configure which types of elements should be given weight when generating an information matrix. As discussed above, faces can be one type of element specified by a user. Other options may include animals, cars, or some element directly entered by a user to avoid. For example, in a content production with multiple cars, a user may specify that cars are to avoided, if possible, in order to not obstruct any of the cars within the content production.

The "Logo position" menu option provides a list of types of preferences to apply within the content positioning algorithm when positioning logo objects, as reflected by element 714. The options for logo positioning that are provided are similar to those provided for text object positioning and are also computed in a similar manner.

The "Create" button 716 initiates the ACCG process when selected by the user. Once clicked, the "Create" option may produce results according to the process described above with respect to FIGS. 3, 4, and 5. For this example, four variations of creative content may be generated, where the Flickr content repository is searched using exact keyword searching of image tags, and the creative content may produce variations where the text objects are at an edge of the content variation and where the logo objects are near a corner of the content variation.

Example Embodiment: User Interface for Presenting Content Variations

Figure 8:
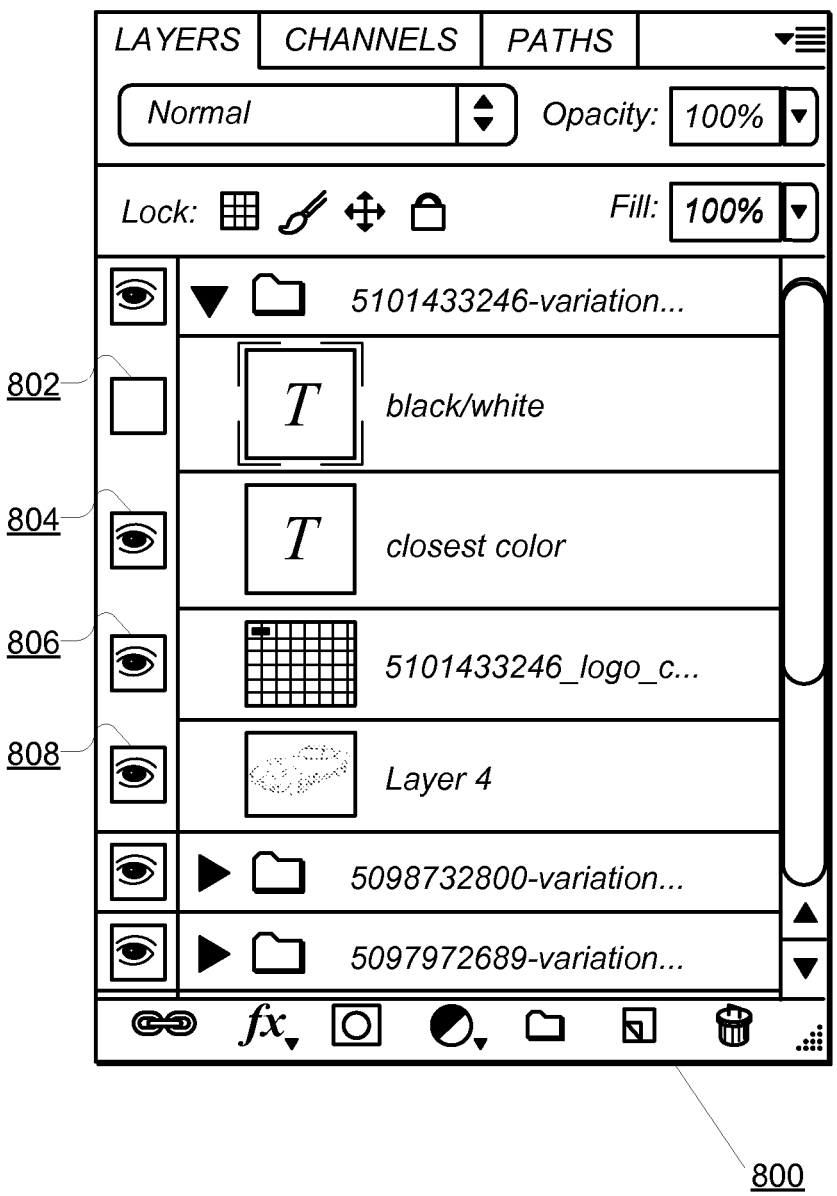
FIG. 8 illustrates example layers within a graphical editing software tool for an original content production composed of multiple content objects.

FIG. 8 depicts a window within an embodiment of the ACCG system where the ACCG system has been incorporated into an image editing software tool, similar to the menu window discussed above with respect to FIG. 7. In this embodiment, the ACCG system may be installed as a plugin to an existing image editing tool. However, in other embodiments, the ACCG may be incorporated into the image editing software tool in different ways, such as building the ACCG functionality into an executable of the image editing software tool.

Window 800 illustrates output produced by the ACCG system in one embodiment. Within window 800 are layer groups organized by folders, where the "5101433246-variation" folder contains four layers. The folder may correspond to a single new content production generated by the above described process with respect to FIGS. 3, 4, and 5. If multiple new content productions are specified to be generated, a folder for each of the generated content productions may be produced.

In other embodiments, instead of, or in addition to, producing a folder of object layers, a new file may be created for each content production. In this example, instead of the ACCG system producing the "5101433246-variation" folder with the four layers as described above, a file is created including the four layers of content objects.

Each layer, elements 802-808, is representative of a new content object generated by the ACCG system, and in this example, the new content production variations includes two text elements (a black and white version, element 802 and a closest color version, element 804), a logo element 806, and an image of a car, element 808. In this example, two variations of new content productions are represented within a single folder. As depicted, content object 804, the black and white version, is visible and content object 802, the closest color version, is not visible. This combination of visible and not visible content objects represents a content production. Toggling the visibility of these two text caption content objects would result in the user seeing a different content production. Such an arrangement allows a user to quickly toggle between different variations of content productions.

The remaining layer groups in the remaining folders similarly contain new content productions generated by the ACCG system. In other embodiments, a folder may contain only content objects for one variation and where each of the content objects is selected as a visible layer. In other embodiments, instead of producing folders, different files may be output.

The organization and presentation of the output produced in this embodiment of the ACCG system is compatible to serve as the output of any of the previously discussed embodiments of the ACCG system. In other words, the new content productions generated by the above discussed embodiments may be output according to the layer groups displayed within FIG. 8.

Example Embodiment: Client/Server Architecture

Figure 9:
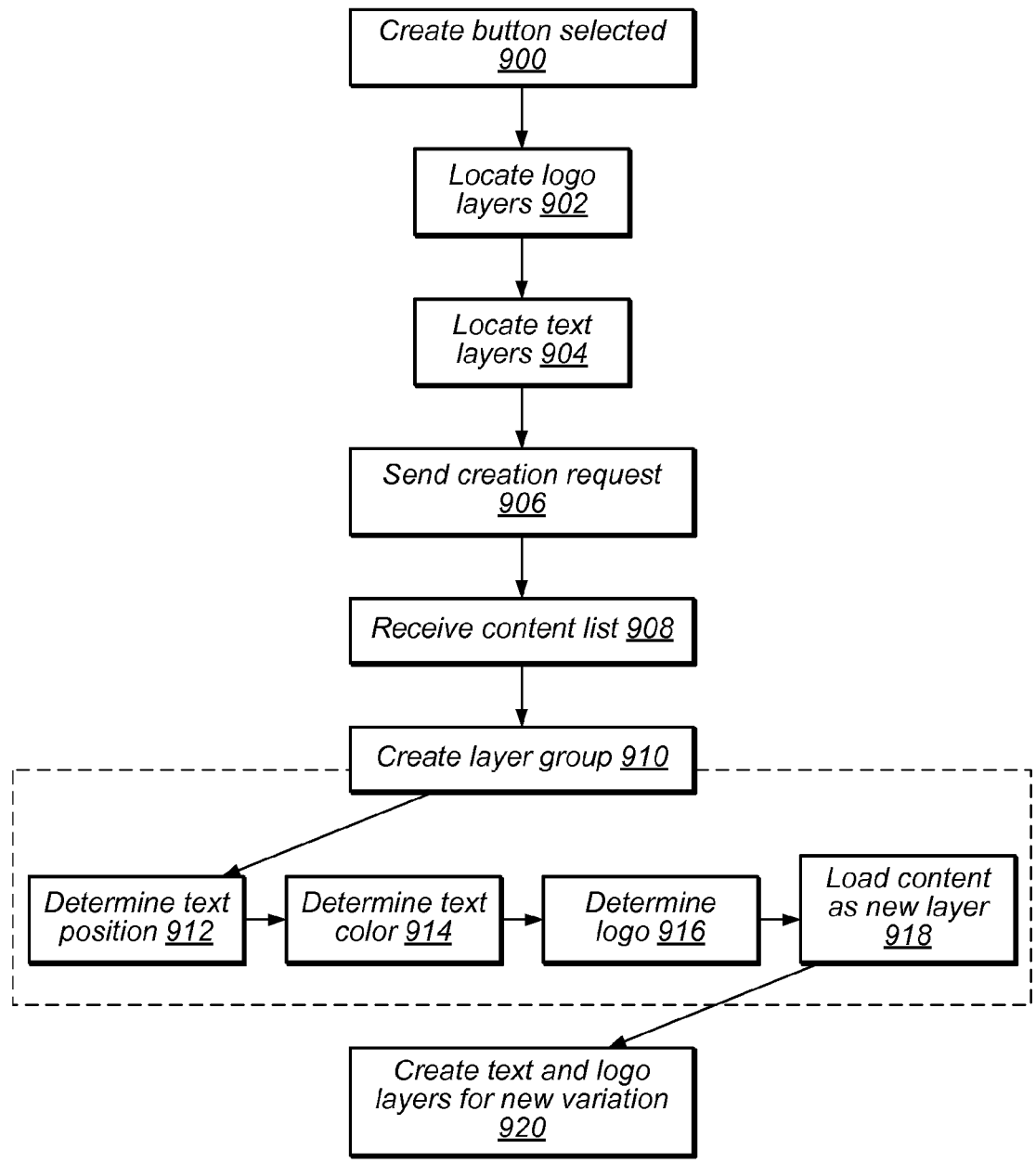
FIG. 9 is a flowchart of an embodiment of the ACCG system within a client/server system, according to one embodiment.
Figure 10:
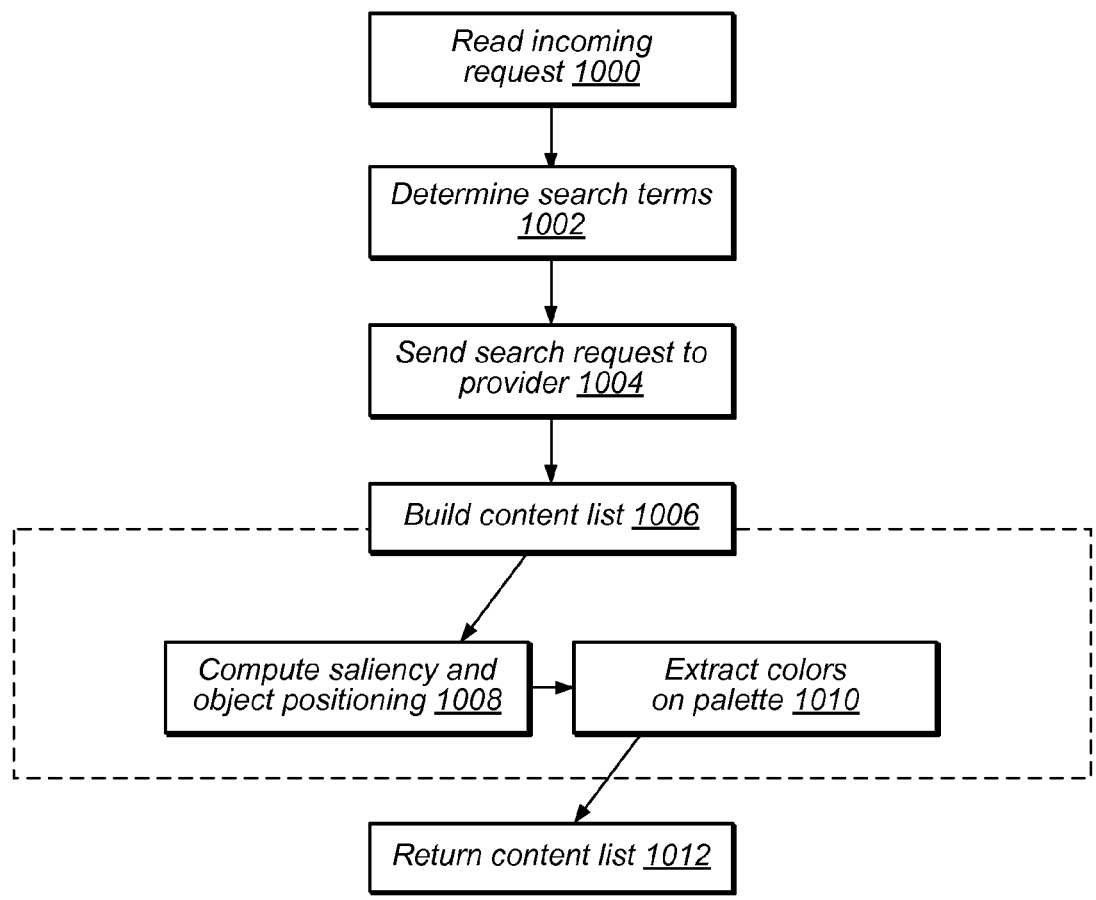
FIG. 10 is a flowchart of an embodiment of the ACCG system within a client/server system, according to one embodiment.

FIGS. 9 and 10 depict a flowchart detailing certain processing steps for an embodiment of the ACCG system within a client/server architecture. FIG. 9 presents steps that may be taken by the client system, and FIG. 10 presents steps that may be taken by a server system. Together, the client and server work to implement the elements of the ACCG system described above.

Figure 14:
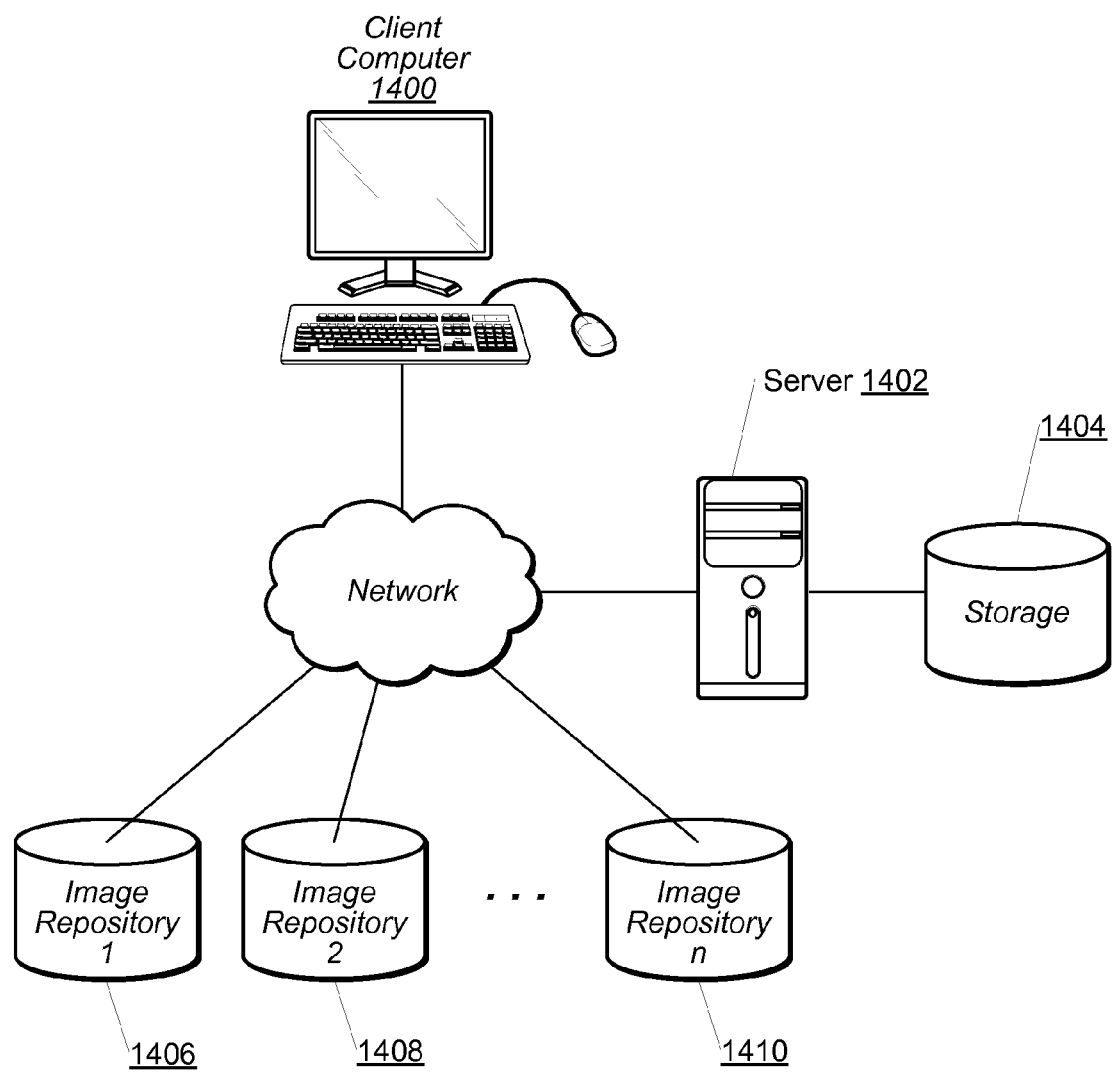
FIG. 14 illustrates an example computer system that may be used in some embodiments.

In this example, the client handles data gathering and handles the representation of results, and the server handles searching and the creation of the content objects. Other distributions of tasks related to implementing the ACCG system are possible, including the case where all steps are performed by either the client or the server. An example system in which this embodiment may be implemented is depicted within FIG. 14, with client computer 1400, server 1402, and content repositories 1406-1410 available over the Internet.

As described above with respect to FIG. 7, a user may configure a menu window to specify how many variations of new content productions to generate, and the guidelines by which the ACCG system should produce the content productions. In this example, when a user has finished specifying the characteristics of the graphical content to be created, a user may click a "Create" button. This initiation step corresponds to step 900.

Upon a user selecting the "Create" button, in this example, the client system may locate the text and logo layers of an original content production, as reflected by steps 902 and 904. In this example, only text and logo elements are selected for variation. Once the text and logo content objects have been determined, the client system may send a content creation request to the server in accordance with the creation guidelines selected by the user, as reflected in step 906. The client computer then waits until the server responds.

At this point, the server receives the creation request, as reflected in step 1000. From the information contained within the creation request, the server may then generate search terms by which a content repository may be queried. In this embodiment, the user, via the user interface in FIG. 7, has specified that the Flickr content repository be searched. After the server issues the search request to the content provider, as reflected in step 1004, the server may then build a content list from the content objects, as reflected in step 1006. Some content repositories provide both free content and content that can be purchased. In the case that a content repository charges for content, a user may be presented with an option to purchase the content as part of the search process. In other embodiments, a user may provide default payment information as part of the initialization of the ACCG system, and content may be purchased without requesting user approval—subject to possible spending limits and conditions.

Building the content list may include computing saliency information to determine object positioning, and extracting color palette information to modify the colors of the content returned, these steps are reflected in steps 1008 and 1010. Further computation steps for processing the content are available and may include the steps discussed above with respect to steps 310, 312, and 314 of FIG. 3.

In other embodiments, the content list may be created on the client side. In such an embodiment, after step 1004 is performed by the server, which issues a search request to a content provider, the search results are returned to the client. Upon receiving the search results, the client may perform the creation of the content list, as currently reflected in steps 1008 and 1010.

In this embodiment, upon building the content list, the server may then return the created content list to the client, as reflected in step 1012. At this point, the client computer may create a layer group as described above with respect to FIG. 8, and reflected in step 910. The creation of a layer group consists of modifications to the content that may then be used in creating a new content production. In this example, with variations for text and logos, the creation of a layer group includes determining text colors, determining text position, and determining the logo characteristics, as reflected in steps 912, 914, and 916.

Once the layer group has been created by the client computer, the created content list may be loaded as part of a new layer group, as reflected in step 918. The text and logo layers for the new content production may then be created within the image editing tool, as reflected in step 920. The created layers may be organized within a layer group as described above with respect to FIG. 8, and displayed to a user.

Example Embodiment: Creating a Single Content Object

Figure 11:
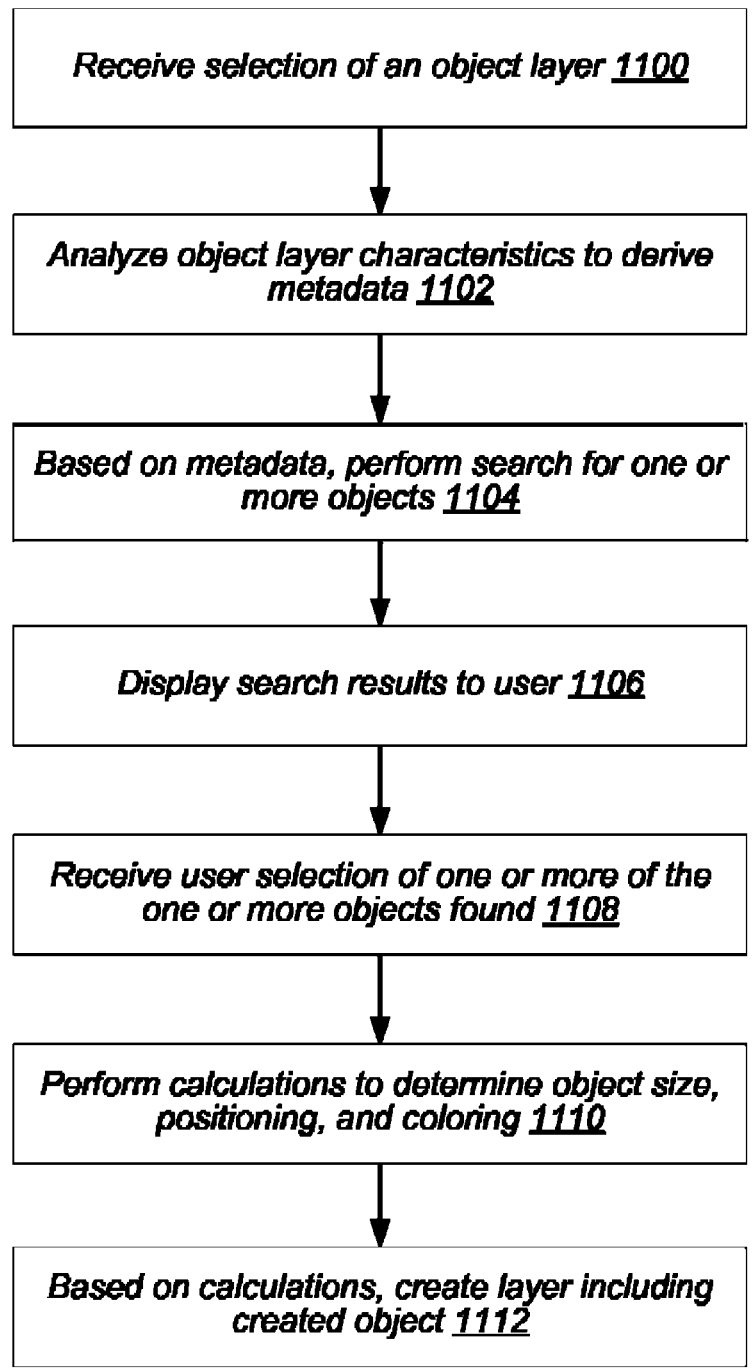
FIG. 11 is a flowchart of an embodiment of the ACCG system for varying a single content object.

FIG. 11 illustrates some steps of an embodiment of the ACCG system used to create and replace a single content object of a content production. When a creative professional is working with an image editing tool, it may be time consuming to leave the image editing tool to search for a content object to then introduce into the image editing tool. Further time is often consumed by the user adjusting colors within the found content object to better fit the color palette of the existing content production. In this embodiment, the creative professional, while working within the image editing tool, may select an option to invoke the ACCG system such that the ACCG system may automatically search for new content objects and may also automatically blend the content object into the current content production.

The first step of FIG. 11, step 1100, is to receive a user selection of a layer to be replaced. This may be accomplished by introducing a button within the user interface of the image editing tool associated with layers. For example, within a layer window, a user may be presented with a button labeled, "More like this layer." The user may also specify constraints such as requiring the same aspect ratio in any images that are found and modified, among other specifications for search.

Once the user has selected the layer and initiated the ACCG method, the ACCG system may then analyze characteristics of the selected layer, as reflected in step 1102. This analysis may derive metadata from the title of the layer within the image editing tool. Alternatively, or additionally, the ACCG method may analyze the content of the layer itself to determine its characteristics. Alternatively, or additionally, the user may directly enter search terms and specify whether the search terms should be adhered to exactly, whether the search should substitute similar words for the user's search terms, or whether the search should be expanded further to include semantically equivalent search terms, similar to the options described above with respect to FIG. 7.

Based on the derived metadata, the ACCG system may perform a search for content objects that satisfy the search criteria, as reflected in step 1104. In this embodiment, the raw search results may be displayed to a user, as in step 1106. This display of objects may be presented within a pop-up window, which allows the user to select one of the found content objects, as reflected in step 1108. In other embodiments, each of the found content objects may be displayed with a respective button titled "More like this one", which allows a user to recursively apply the ACCG method on successively returned content objects, allowing a user to successively refine a content search.

Figure 12:
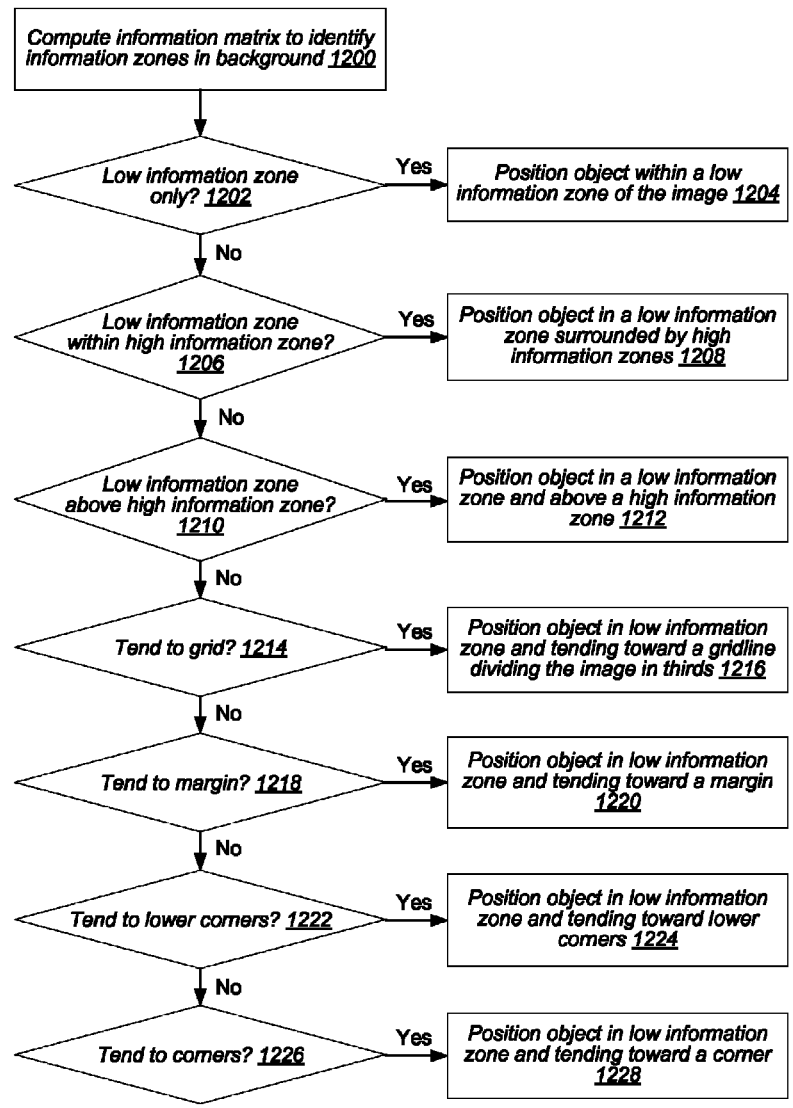
FIG. 12 is a flowchart of an embodiment of the ACCG system depicting processing steps for positioning an object within a content production.
Figure 13:
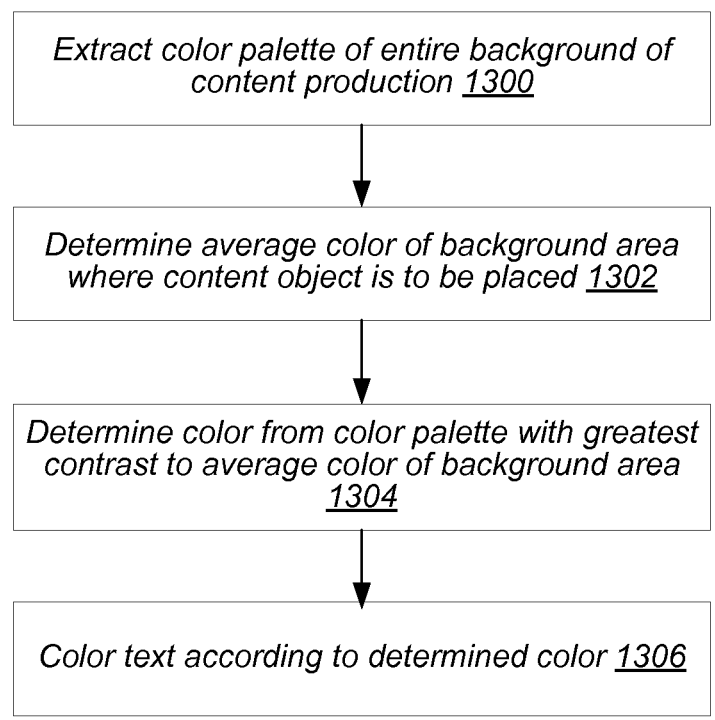
FIG. 13 is a flowchart of an embodiment of the ACCG system depicting processing steps for recoloring a content object.

Once the user has selected one of the returned content objects, as in step 1108, the ACCG system may then perform calculations to modify characteristics of the found content object such as size, positioning, and coloring, as in step 1110. These adjustments may be performed automatically, or in response to the user indicating that the content object be blended in, for example, by clicking on a "Blend" button associated with the content object selected. FIGS. 12 and 13 present some of the available techniques for blending the content object into the current content production, such as positioning and color palette adjustments. In other embodiments, the ACCG system may automatically perform the blending steps including adjustments to size, position, and coloring before the content objects are initially displayed to the user. In other embodiments, the user may also be presented with the option to toggle between the already blended content objects and the raw content object found, or to otherwise manually adjust characteristics of the content object.

Upon a content object being selected, and possibly modified to better blend in with existing content production, a new layer is created including the content object and the layer is then introduced into the image editing tool, as reflected in step 1112. In other embodiments, the entire process of introducing a single content object may be automated. In such an automated embodiment, instead of a user being presented with search results of content objects, the ACCG system may select a found content object to include within the content production.

Example Embodiment: Positioning a Content Object

FIG. 12 illustrates certain steps of a method for positioning a content object within a content production. This positioning method may be used in conjunction with the previously described embodiments of the ACCG system for determining the location within a content production in which to locate a newly created content object, such as that described above with respect to step 310 of FIG. 3 and step 1110 of FIG. 11.

The positioning method attempts to overlap the content being located with as few important background zones as possible or as practical. In addition to avoiding the overlap of important background zones, the positioning method may also attempt to satisfy general design guidelines. Each of the seven positioning options presented within FIG. 12 may be presented to a user within a user interface, and the option selected may guide the positioning of a content object.

In this embodiment, an information matrix is calculated to identify information zones of the original content production. Information zones may be based on a saliency map of the background image of the original content production. The information zones may also use other factors as a basis, such as output from a facial detection analysis. Alternatively, or in addition, information zones may be defined or weighted by a user. For example, a user may specify a preference for some areas of an original content production to be occupied or not to be occupied by any content.

In some embodiments, in addition to the calculation of the information matrix, an auxiliary matrix is calculated as part of a process to identify the low and high information zones used in FIG. 12. The auxiliary matrix allows for a rapid computation of the total amount of information covered by a given rectangle of a given size within a content production. Using the information matrix, the auxiliary matrix, and the dimensions of a content object, a cost function may be calculated for each possible placement of the content object within the content production. A minimum cost function for a given position within the content production may result in a placement of the content object which represents a good trade-off between covering a small amount of information and respecting general design principles.

Given the dimensions of a content object to be positioned, a rectangle is placed each position within the content production and a cost function is calculated. A cost function may be defined for each of the positioning methods available. An auxiliary matrix may be used to fasten the computation of this cost function using dynamic programming: at position $(i, j)$ it would store the total information in the rectangle with the top left corner at $(0,0)$ and the lower right corner at $(i,j)$.

Using these preliminary definitions, in this example, given the selection of the low information zone only option, as reflected by element 1204, a cost function may be defined as $info(x, y, w, h)$, where w and h denote the dimensions of the content object, x and y denote the current position being considered, and $info(x, y, w, h)$ is the total information within the rectangle with top left corner $(x, y)$ having width w and height h. This positioning calculation is applied after a determination in decision step 1202 that only a low information zone positioning is to be applied.

If decision step 1206 determines whether the positioning option is to base positioning within a low information zone surrounded by high information zones, a cost function may be defined for such a positioning, as reflected in element 1208. In this case, a cost function may be defined as $K_1 * v_1 - v_2$, where $v_1 = \text{info}(x, y, w, h)$, $v_2 = \text{info}(x-w, y-h, w+2*w, h+2*h)$, and where $K_1$ is an adjustable value depending on whether it is more important to place the content object in a low saliency zone (high $K_1$ value), or to place the content object in an area surrounded by high saliency (low $K_1$ value).

If decision step 1210 determines whether the positioning option is to base positioning according to a low information zone above a high information zone, a cost function may be defined for such a positioning, as reflected in element 1212. In this case, a cost function may be defined as $K_1 * v_1 - v_2$, where $v_1 = \text{info}(x, y, w, h)$, and $v_2 = \text{info}(x, y, w, h+K_2*h)$. Unlike the case reflected in element 1208, here $v_2$ corresponds to information situated inside a vertically enlarged zone, and the amount the zone is enlarged below the actual placement corresponds to constant $K_2$, which may have a default value of 0.25.

If decision step 1214 determines whether the positioning option is to base positioning according to a preference to tend toward a gridline, a cost function may be defined for such a positioning, as reflected in element 1216. In this case, a cost function may be defined as $v * f_w(\text{distance}_w) * f_h(\text{distance}_h)$, where $f_w = \text{increase}(w/9, t=1000)$, $f_h = \text{increase}(h/9, t=1000)$, $\text{distance}_w =$ [distance to the closest of the vertical lines of the grid], $\text{distance}_h =$ [distance to the closest of the horizontal lines of the grid], $v = \text{info}(x, y, w, h)+1$, and $\text{increase}(x, y) =$ [an exponentially increasing function determined by two parameters, x and y, such that $f(0)=1$ and $f(x)=t$, where $t>1$ and is the parameter that governs how fast the function increases. In this example, a large value for t corresponds to penalizing positions far from the desired grid-tending position, and results in positioning toward a grid even if a low saliency area cannot be found.

If decision step 1218 determines whether the positioning option is to base positioning according to a preference to tend toward a margin, a cost function may be defined for such a positioning, as reflected in element 1220. In this case, a cost function may be defined as $v*(\text{distance})$, where $f=\text{increase}(1, t=1000)$, $\text{distance}=\text{MIN}(\text{distance}_w, \text{distance}_h)$, $\text{distance}_h=$ [distance between object center and the closest horizontal margin]/[height of the content object], $\text{distance}_w=$ [distance between content object center and the closest vertical margin]/[width of the content object], and $v=\text{info}(x, y, w, h)+1$.

If decision step 1222 determines whether the positioning option is to base positioning according to a preference toward lower corners, a cost function may be defined for such a positioning, as reflected in element 1224. In this case, a cost function may be defined as $v*f(\text{distance/IMAGE\_DIAGONAL})$, where $f=\text{increase}(1, t=1000)$, $\text{distance}=\text{MIN}(50*$[distance to closest top corner], [distance to closest lower corner])/[diagonal of the content object], and $v=\text{info}(x, y, w, h)+1$.

If decision step 1226 determines whether the positioning option is to base positioning according to a preference to tend toward a corner, a cost function may be defined for such a positioning, as reflected in element 1228. In this case, a cost function may be defined as $v*f(\text{distance/IMAGE\_DIAGONAL})$, where $f=\text{increase}(1, t=1000)$, $\text{distance}=$[distance between the content object and the closest margin], and $v=\text{info}(x, y, w, h)+1$.

In the above example cost functions, different constants may be used depending on a saliency model, or the constants may be adjusted by a user. If parameters to the cost functions are adjustable by a user, then a user may experiment with how different parameter values result in different content object placement.

Different positioning options may be best for different types of content objects. For example, the best option for a logo may be to tend toward lower corners, while the best option for a text caption object may be to tend toward a margin.

As noted above, at the completion of the positioning method, a position for a content object may be determined, and this position may be used by the ACCG system to place a single content object within a new content production, or an existing content production, depending on the embodiment.

Example Embodiment: Blending Colors of a Content Object

FIG. 13 illustrates certain steps of a method for modifying the colors of a content object to be placed within a content production. In this embodiment, in order to modify the colors of a content object, the color palette of the background of the content production is compared against the average background color of the area of the content production where the content object is to be placed. This coloring method may be used in conjunction with the previously described embodiments of the ACCG system for adjusting the colors of a content object before or after it is to be introduced into an existing content production, such as described above with respect to step 312 of FIG. 3.

The first step, step 1300, is to extract the color palette of the entire background of the existing content production. A contrasting color may be selected from one of the colors of the color palette to ensure that a selected color blends with the existing colors of the background of the content production.

The background area where the content object has been determined to be positioned is analyzed to determine the average color of this area, as in step 1302. This average color is the color against which a contrasting color may be determined. The contrasting color selected may be a color from the color palette of the entire background that results in the greatest contrast to the average color of the area where the content object is to be located. This selection step is reflected in step 1304. An example method for determining color difference is using a color distance calculation.

Once the new color is determined, the content object or at least the background of the content object may be recolored according to the selected color. Because the new color is drawn from the color palette of the existing content production, the result should be a recolored content object that better blends into the existing graphical content.

Example Computer System

Figure 15:
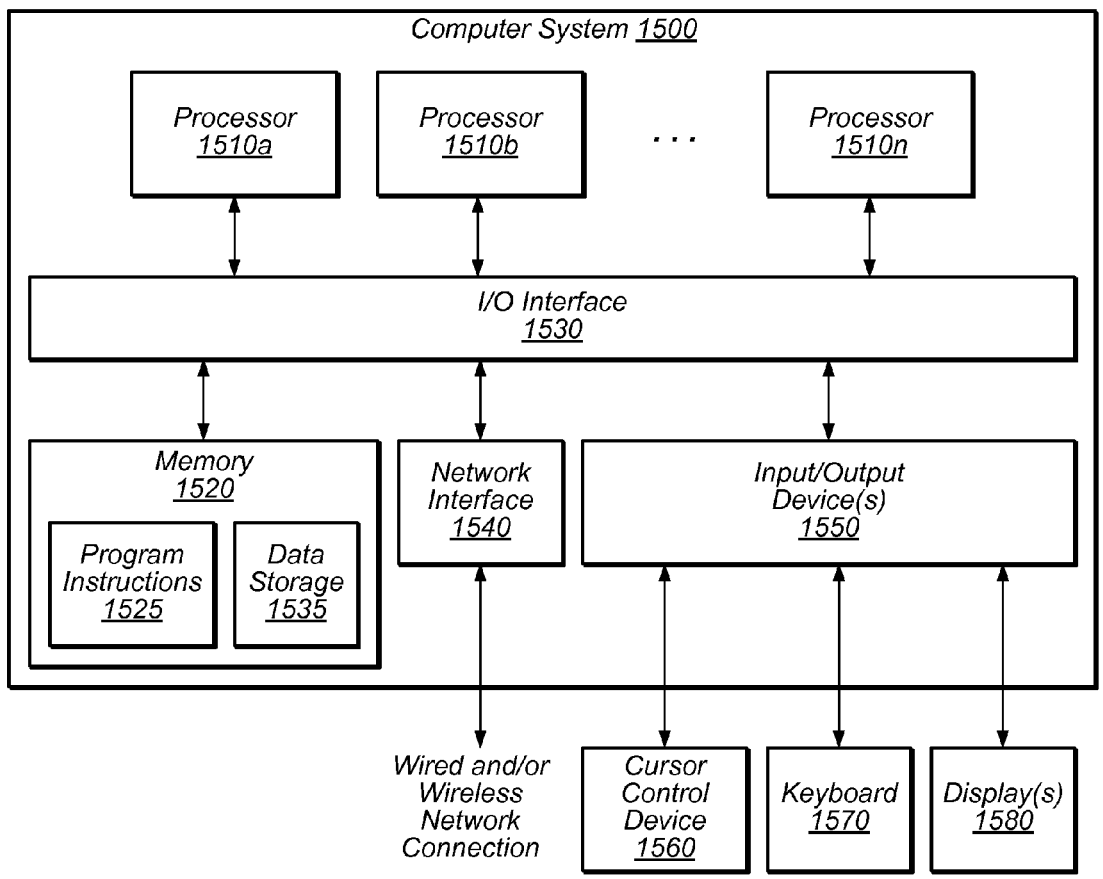
FIG. 15 illustrates an example system that may be used in some embodiments.

FIG. 15 illustrates a computer system 1500 that may execute embodiments of an ACCG system. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, the computer system includes one or more processors coupled to a system memory via an input/output (I/O) interface. The computer system further includes a network interface coupled to an I/O interface, and one or more input/output devices, such as a cursor control device, a keyboard, and display(s). In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible by a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an ACCG system are shown stored within system memory as program instructions and data storage, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted by transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for use by another component. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data by one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement embodiments of an ACCG system as described herein. In one embodiment, the program instructions may include software elements of embodiments of the modules discussed earlier in one of the embodiments of the ACCG system. The data storage within the computer system may include data that may be used in other embodiments. In these other embodiments, other or different software elements and data may be included.

Those skilled in the art will appreciate that the computer system is merely illustrative and is not intended to limit the scope of the ACCG system as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally, a computer-accessible medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or by a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    creating a variation of a visual content production by at least:
        for each of a plurality of visual content objects of the visual content production:
            selecting a visual content object from the plurality of visual content objects of the visual content production;
            analyzing the selected visual content object to derive metadata for the selected visual content object, the metadata describing characteristics of the selected visual content object;
            searching for an alternative visual content object according to search parameters, the search parameters being based on the metadata describing the characteristics of the selected visual content object;
            automatically creating a new visual content object by at least modifying the alternative visual content object based on one or more characteristics of the visual content production to blend the alternative visual content object into the visual content production; and
            based on the new visual content object, automatically creating a variation portion for the variation of the visual content production; and
        generating the variation of the visual content production based on each created variation portion; and
    repeating said creating a variation of the visual content production to create a plurality of different variations of the visual content production.

2. The computer-implemented method of claim 1, wherein said automatically creating a variation portion further comprises:
    determining a location for the new visual content object within the variation of the visual content production,
    wherein the location is based on a location function value, and
    wherein the location function value is based on an image saliency function and a position function.

3. The computer-implemented method of claim 1, wherein said selecting further comprises:
    identifying the plurality of visual content objects from visual content layers within the visual content production.

4. The computer-implemented method of claim 1, wherein said automatically creating the new visual content object further comprises:
    determining a color for the new visual content object within the variation of the visual content production, wherein the color is based on a user preference and a color function value, and wherein the color function value is calculated from a color palette for the variation of the visual content production.

5. The computer-implemented method of claim 1, wherein the search parameters are further based on one or more user specified search preferences.

6. The computer-implemented method of claim 1, wherein:
    the plurality of visual content objects is derived through analyzing a scene in the visual content production to decompose the visual content production into constituent visual content objects; and
    the metadata is derived through an analysis of characteristics of the constituent visual content objects.

7. The computer-implemented method of claim 1, wherein the metadata is derived from a user-provided description of one or more visual content objects from the plurality of visual content objects.

8. A system, comprising:
    at least one processor; and
    a memory comprising program instructions that are executable by the at least one processor to:
        create a variation of a visual content production by at least:
            for each of a plurality of visual content objects of the visual content production:
                selecting a visual content object from the plurality of visual content objects of the visual content production;
                analyzing the selected visual content object to derive metadata for the selected visual content object, the metadata describing characteristics of the selected visual content object;

searching for an alternative visual content object according to search parameters, the search parameters being based on the metadata describing the characteristics of the selected visual content object;

automatically creating a new visual content object by at least modifying the alternative visual content object based on one or more characteristics of the visual content production to enable the alternative visual content object to blend into the visual content production; and based on the new visual content object, automatically creating a variation portion for the variation of the visual content production; and generating the variation of the visual content production based on each created variation portion; and repeat said creation of a variation of the visual content production to create a plurality of different variations of the visual content production.

9. The system of claim 8, wherein:

the variation portion is automatically created based on a determination of a location for the new visual content object within the variation of the visual content production;

the location is based on a location function value; and the location function value is based on an image saliency function and a position function.

10. The system of claim 8, wherein the visual content object is selected based on identification of the plurality of visual content objects from visual content layers within the visual content production.

11. The system of claim 8, wherein:

the new visual content object is automatically created based on a determination of a color for the new visual content object within the variation of the visual content production;

the color is based on a user preference and a color function value; and the color function value is calculated from a color palette for the variation of the visual content production.

12. The system of claim 8, wherein the search parameters are further based on one or more user specified search preferences.

13. The system of claim 8, wherein:

the plurality of visual content objects are derived through analyzing a scene in the visual content production to decompose the visual content production into constituent visual content objects; and the metadata is derived through an analysis of characteristics of the constituent visual content objects.

14. The system of claim 8, wherein the metadata is derived from a user-provided description of one or more visual content objects from the plurality of visual content objects.

15. A computer-readable storage device storing program instructions that are computer-executable to perform operations comprising:

creating a variation of a visual content production by at least:

for each of a plurality of visual content objects of the visual content production:

selecting a visual content object from the plurality of visual content objects of the visual content production;

analyzing the selected visual content object to derive metadata for the selected visual content object, the metadata describing characteristics of the selected visual content object;

searching for an alternative visual content object according to search parameters, the search parameters being based on the metadata describing the characteristics of the selected visual content object;

modifying the alternative visual content object based on one or more characteristics of the visual content production to blend the alternative visual content object into the visual content production; and based on the modified alternative visual content object, automatically creating a variation portion for the variation of the visual content production; and generating the variation of the visual content production based on each created variation portion; and repeating said creating a variation of the visual content production to create a plurality of different variations of the original visual content production.

16. The computer-readable storage device of claim 15, wherein:

the variation portion is automatically created by determining a location for the modified alternative visual content object within the variation of the visual content production;

the location is based on a location function value; and the location function value is based on an image saliency function and a position function.

17. The computer-readable storage device of claim 15, wherein said selecting further comprises:

identifying the plurality of visual content objects from visual content layers within the visual content production.

18. The computer-readable storage device of claim 15, wherein:

the alternative visual content object is modified by at least determining a color for the alternative visual content object within the variation of the visual content production;

the color is based on a user preference and a color function value; and the color function value is calculated from a color palette for the variation of the visual content production.

19. The computer-readable storage device of claim 15, wherein the search parameters are further based on one or more user specified search preferences.

20. The computer-readable storage device of claim 15, wherein:

the plurality of visual content objects are derived through analyzing a scene in the visual content production to decompose the visual content production into constituent visual content objects; and the metadata is derived through an analysis of characteristics of the constituent visual content objects.

* * * * *